(12) United States Patent
Look et al.

(10) Patent No.: US 9,082,189 B2
(45) Date of Patent: Jul. 14, 2015

(54) AUTOMATED BOUNDING BOX GENERATION WITHIN THE BOUNDARIES OF ARBITRARY SHAPES

(75) Inventors: Gary Look, Medford, MA (US); Prashant Singh, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 765 days.

(21) Appl. No.: 13/208,481

(22) Filed: Aug. 12, 2011

(65) Prior Publication Data
US 2013/0038628 A1 Feb. 14, 2013

(51) Int. Cl.
| G09G 5/00 | (2006.01) |
| G06T 7/00 | (2006.01) |
| G06T 11/40 | (2006.01) |
| G06K 9/32 | (2006.01) |
| G06T 15/40 | (2011.01) |
| G06T 15/00 | (2011.01) |
| G06T 15/30 | (2011.01) |

(52) U.S. Cl.
CPC .......... *G06T 7/0081* (2013.01); *G06K 9/3216* (2013.01); *G06T 7/004* (2013.01); *G06T 11/40* (2013.01); *G06T 15/005* (2013.01); *G06T 15/30* (2013.01); *G06T 15/40* (2013.01); *G06T 2210/12* (2013.01)

(58) Field of Classification Search
CPC ....... G06T 15/30; G06T 11/40; G06T 15/005; G06T 15/40; G06T 2210/12
USPC .......... 707/803, 812, 804; 345/619, 420, 424, 345/620, 622; 382/206, 286, 291, 203, 204
See application file for complete search history.

(56) References Cited

U.S. PATENT DOCUMENTS

| 5,684,940 | A | * | 11/1997 | Freeman et al. | 345/630 |
| 5,796,634 | A | * | 8/1998 | Craport et al. | 702/150 |
| 5,961,572 | A | * | 10/1999 | Craport et al. | 701/400 |
| 6,154,219 | A | * | 11/2000 | Wiley et al. | 345/587 |
| 6,172,682 | B1 | * | 1/2001 | Claiborne et al. | 345/441 |
| 6,665,840 | B1 | * | 12/2003 | Wiley et al. | 715/234 |
| 6,674,445 | B1 | * | 1/2004 | Chithambaram et al. | 345/619 |
| 7,971,143 | B2 | * | 6/2011 | Santanche et al. | 715/736 |
| 8,432,400 | B1 | * | 4/2013 | Weskamp | 345/473 |
| 8,531,315 | B2 | * | 9/2013 | Painter et al. | 340/972 |
| 2007/0021905 | A1 | * | 1/2007 | Takashima et al. | 701/201 |
| 2008/0051994 | A1 | * | 2/2008 | Fisher et al. | 701/210 |
| 2010/0188430 | A1 | * | 7/2010 | Chamaret et al. | 345/668 |
| 2010/0266212 | A1 | * | 10/2010 | Maurer et al. | 382/206 |
| 2010/0287207 | A1 | * | 11/2010 | Motoyama | 707/803 |
| 2011/0320319 | A1 | * | 12/2011 | Streich | 705/27.1 |

* cited by examiner

*Primary Examiner* — Abderrahim Merouan
(74) *Attorney, Agent, or Firm* — Miles & Stockbridge P.C.

(57) ABSTRACT

One embodiment is directed to a computer program, embodied on a computer readable medium. The computer program is configured to control a processor to execute instructions. The instructions include sampling a plurality of points that lie within the interior of an arbitrary shape, drawing one or more rectangles from each of the points, gradually increasing the length and width of the rectangles until the rectangles no longer falls within the interior of the arbitrary shape, and assigning the largest of the increased rectangles as the interior bounding box.

18 Claims, 5 Drawing Sheets

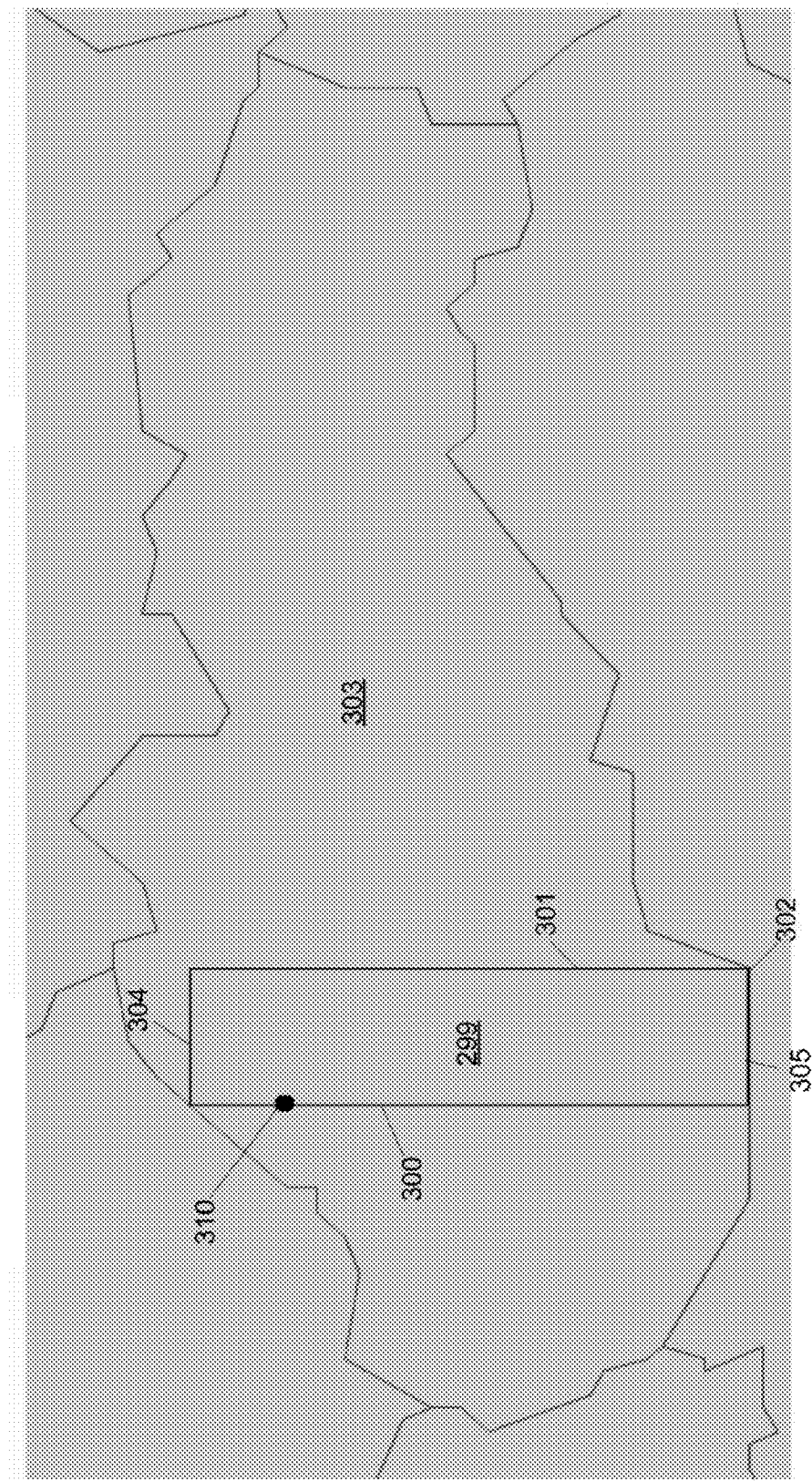

AUTOMATED BOUNDING BOX GENERATION WITHIN THE BOUNDARIES OF ARBITRARY SHAPES

FIELD

One embodiment is directed generally to a computer system, and in particular to a system for automatically generating a bounding box within an arbitrary shape.

BACKGROUND INFORMATION

A minimum bounding box or minimum bounding rectangle is the smallest box or rectangle that completely encloses a two dimensional object, such as a rectangle or polygon, within its two dimensional (x, y) coordinate system. Minimum bounding boxes can be used as an indication of the general position of a geographic feature or dataset for display, first approximation spatial query, or spatial indexing purposes.

When labels or images need to be placed within the boundaries of arbitrary shapes, an interior bounding box may be utilized. An interior bounding box is a rectangle that defines the area within which items, such as labels, images, text, and/or other information, can be placed such that these items are guaranteed to lie within the boundaries of the arbitrary shape.

Prior art solutions generated the interior bounding box by manually specifying its size. Alternatively, other prior art solutions approximated the interior bounding box by using the shape's minimum bounding box, which, as discussed above, is the smallest rectangle that completely contains the arbitrary shape.

SUMMARY

One embodiment is directed to a computer program, embodied on a computer readable medium. The computer program is configured to control a processor to execute instructions. The instructions include sampling a plurality of points that lie within the interior of an arbitrary shape, drawing one or more rectangles from each of the points, gradually increasing the length and width of the rectangles until each of the rectangles no longer falls within the interior of the arbitrary shape, and assigning the largest of the increased rectangles as the interior bounding box.

BRIEF DESCRIPTION OF THE DRAWINGS

FIG. 2b illustrates an example of an expansion of a rectangle within an arbitrary shape according to another embodiment;

DETAILED DESCRIPTION

One embodiment is directed to a bounding box generator for generating a bounding box within an arbitrary shape. The bounding box generator may include a sampler configured to sample a plurality of points that lie within the interior bounds of the arbitrary shape. The bounding box generator may also include a generator configured to draw one or more rectangles from each of the sampled points, and to then gradually increase or stretch the length and/or width of each of the rectangles until they no longer fall within the interior of the arbitrary shape. The bounding box generator may further include an assignor configured to assign the largest of the stretched rectangles as the interior bounding box for the arbitrary shape.

Figure 1:
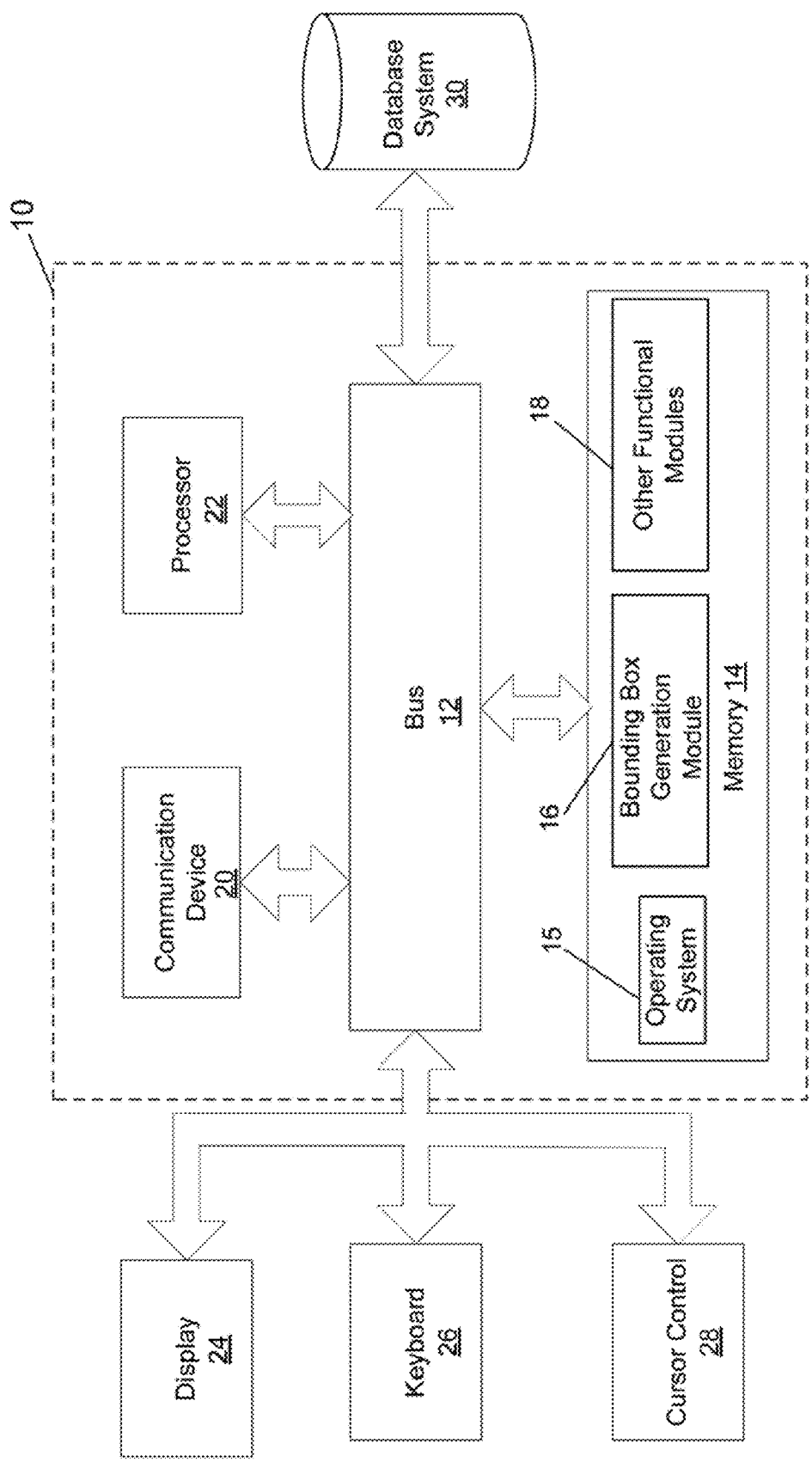
FIG. 1 illustrates a system according to one embodiment of the invention.

FIG. 1 illustrates a block diagram of a system 10 that may perform bounding box generation, according to one embodiment. System 10 includes a bus 12 or other communications mechanism for communicating information between components of system 10. Alternatively, the components of system 10 may communicate with each other directly without the use of bus 12.

System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as arbitrary shapes and rectangles or bounding boxes within the arbitrary shapes, as will be discussed in more detail below. A keyboard 26 and a cursor control device 28, such as a computer mouse, are further coupled to bus 12 to enable a user to interface with system 10.

Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments. In some embodiments, database system 30 may store information related to displayed shapes or points, such as their dimensions, area, coordinates, and any other relevant attributes.

In one embodiment, memory 14 stores software modules that provide functionality when executed by processor 22. The modules may include an operating system 15 that provides operating system functionality for system 10. The memory may also store a bounding box generation module 16, which can provide the functionality for generating an interior bounding box within an arbitrary shape, according to one embodiment. System 10 may also include one or more other functional modules 18 to provide additional functionality.

Database system 30 may include a database server and any type of database, such as a relational or flat file database. Database system 30 may store attributes related to the arbitrary shapes and rectangles or bounding boxes within the arbitrary shapes. Database system 30 may also store any other data required by the bounding box generation module 16, or data associated with system 10 and its associated modules and components.

In certain embodiments, processor 22, bounding box generation module 16, and other functional modules 18 may be implemented as separate physical and logical units or may be implemented in a single physical and logical unit. Furthermore, in some embodiments, processor 22, bounding box generation module 16, and other functional modules 18 may be implemented in hardware, or as any suitable combination of hardware and software.

In one embodiment, bounding box generation module 16 is configured to control system 10 to perform a process of generating an interior bounding box within an arbitrary shape. The interior bounding box can then be used to place items, such as labels, images, or other text within the arbitrary shape, while guaranteeing that the items completely fall within the shape and do not spill outside the shape or overlap into a neighboring shape.

According to certain embodiments, bounding box generation module 16 is configured to control system 10 to overlay a grid of squares onto the arbitrary shape, and sample a plurality of points on the grid. In one embodiment, the sampled points are points at the center of each square of the grid overlaid on the arbitrary shape. Bounding box generation module 16 is configured to control system 10 to draw, sketch, or create one or more small rectangles from each of the sampled points. Initially, the one or more small rectangles completely fit within the interior of the arbitrary shape without touching any portion of the boundary of the arbitrary shape. According to one embodiment, the sampled points at the center of the grid squares are used as the upper-left hand corner for the rectangles that are created.

In certain embodiments, bounding box generation module 16 is further configured to control system 10 to gradually increase or stretch the height and width of the rectangles until the rectangles touch at least one side or point on the arbitrary shape, or until the rectangles no longer fall within the interior of the arbitrary shape. Bounding box generation module 16 is further configured to control system 10 to assign or allocate the largest of the rectangles in terms of area as the interior bounding box. In one embodiment, memory 14 and/or database system 30 can monitor and continuously store data on the largest rectangle found during the process of gradually increasing the size of the rectangles.

Figure 2A:
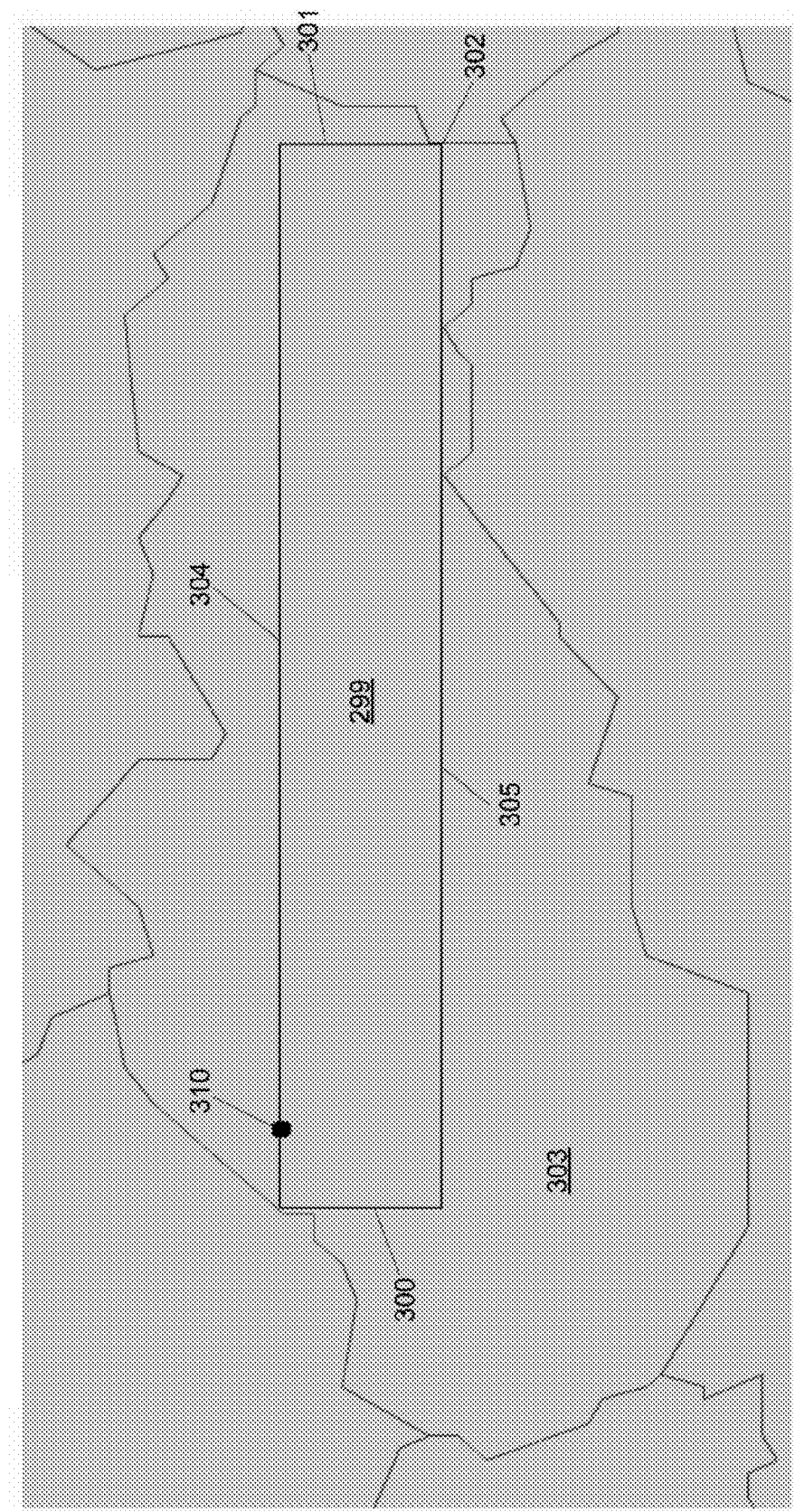
FIG. 2a illustrates an example of an expansion of a rectangle within an arbitrary shape according to one embodiment.

Bounding box generation module 16 and system 10 can use multiple approaches for gradually increasing or stretching the rectangles. In one embodiment, bounding box generation module 16 can utilize a width-first expansion method for increasing or stretching the size of the rectangle. FIG. 2a illustrates one example of the width-first expansion method. In this width-first expansion method, as shown in FIG. 2a, the width of the rectangle 299 is first increased until one point on the left 300 and one point on the right 301 sides of the rectangle 299 touch the boundary 302 of the arbitrary shape 303. Then, the height of the rectangle 299 is increased until one point on the top 304 and one point on the bottom 305 sides of the rectangle 299 touches the boundary 302 of the arbitrary shape 303. In one embodiment, point 310 represents the sampled point that was at the upper-left corner of the rectangle prior to applying the width-first expansion method.

According to another embodiment, bounding box generation module 16 can utilize a height-first expansion method for increasing or stretching the size of the rectangle. FIG. 2b illustrates one example of the height-first expansion method. In one embodiment, point 310 represents the sampled point that was at the upper-left corner of the rectangle prior to applying the height-first expansion method. According to the height-first expansion method, as shown in FIG. 2b, the height of the rectangle 299 is increased first, until at least a portion of the top 304 and bottom 305 sides of the rectangle 299 touches the boundary 302 of the arbitrary shape 303. Then, according to the height-first expansion method, the width of the rectangle 299 is increased until at least a portion of left 300 and right 301 sides of the rectangle 299 touches the boundary 302 of the arbitrary shape 303.

Figure 2C:
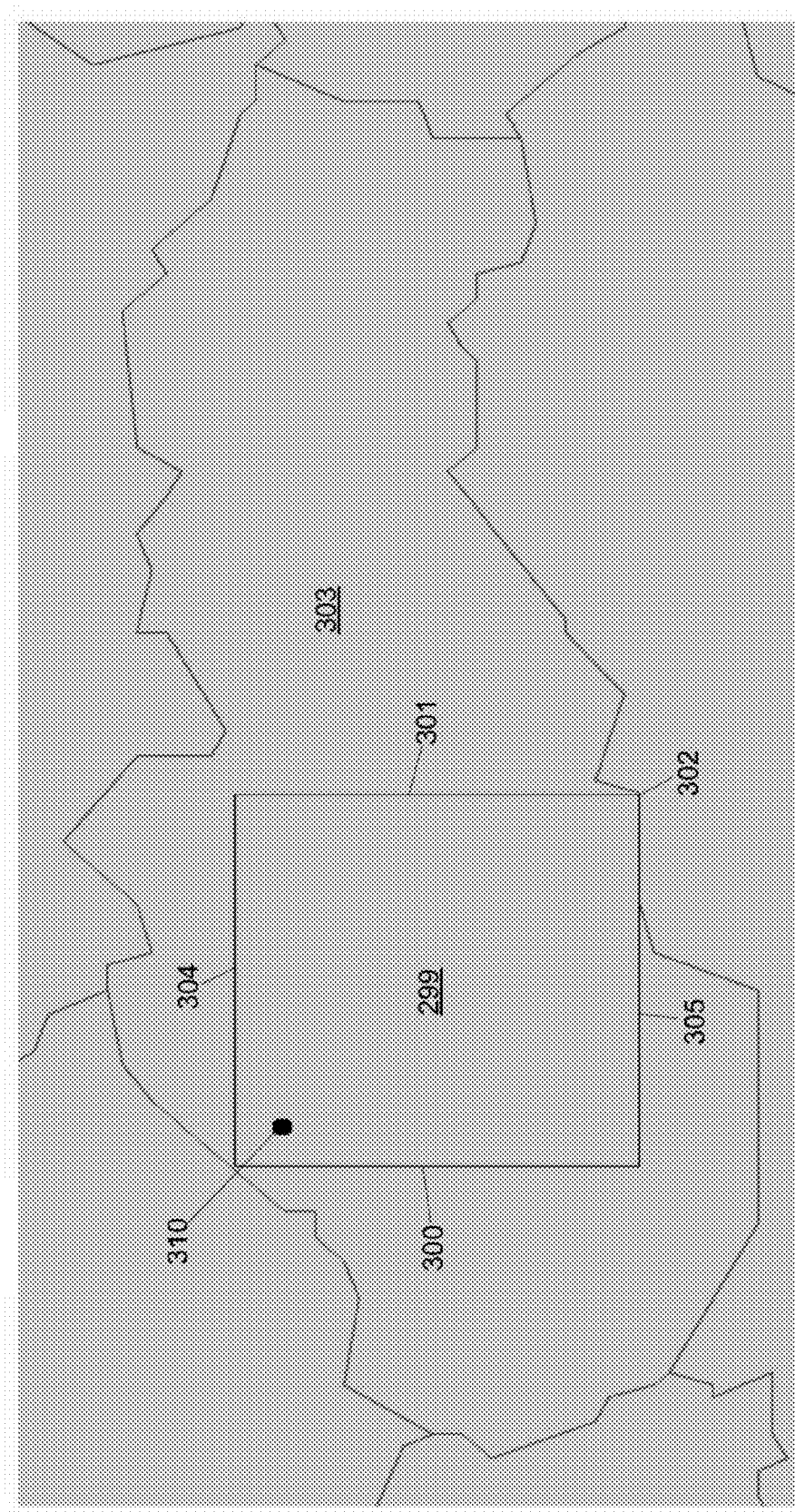
FIG. 2c illustrates an example of an expansion of a rectangle within an arbitrary shape according to another embodiment.

In yet another embodiment, bounding box generation module 16 can utilize an equal height-width expansion method for increasing or stretching the size of the rectangle. FIG. 2c illustrates one example of the equal height-width expansion method, according to one embodiment. As illustrated in FIG. 2c, the equal height-width expansion method involves alternately increasing the height and width of the rectangle 299 until at least a portion of all four sides 300, 301, 304, 305 of the rectangle 299 touch the boundary 302 of the arbitrary shape 303. In one embodiment, point 310 represents the sampled point that was at the upper-left corner of the rectangle prior to applying the equal height-width expansion method. In this embodiment, after application of the equal height-width expansion method, point 310 is shown inside rectangle 299 because of the alternate stretching of the height and width by small amounts.

As can be seen from each of FIGS. 2a-2c each of the expansion methods in this example produce rectangles with different sizes, areas and dimensions. Embodiments of the invention may utilize one, two, or all three of the expansion methods in any combination.

Further, while the embodiments illustrates in FIGS. 2a-2c utilize maps as an example of the arbitrary shapes, other embodiments of the invention are not limited to such an example. For instance, embodiments of the invention may be used to generate interior bounding boxes for labeling any sort of diagram, picture or image, including, but not limited to, pie charts, part diagrams, anatomy figures, or any other item containing or composed of arbitrary shapes.

Figure 3:
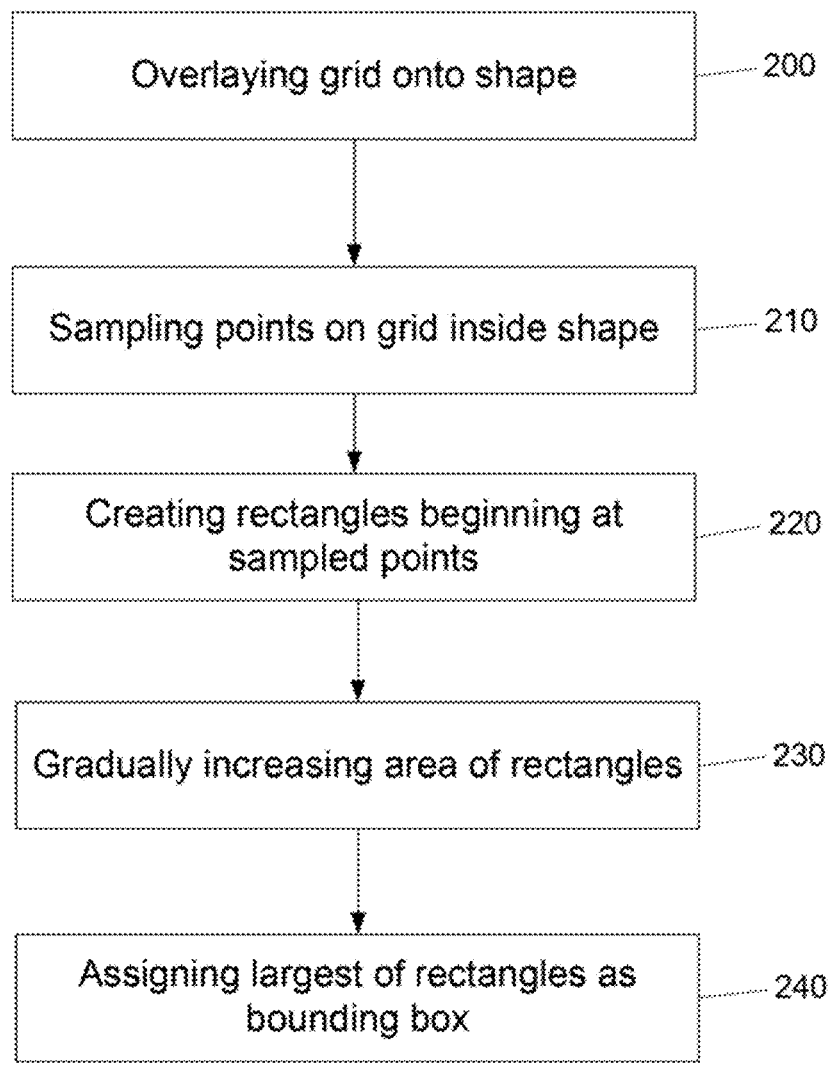
FIG. 3 illustrates a flow diagram of a method according to an embodiment.

FIG. 3 illustrates a flow diagram of a method for generating an interior bounding box within an arbitrary shape, according to one embodiment. In certain embodiments, the functionality of the flow diagram of FIG. 3, is implemented by software stored in memory or other computer readable or tangible media, and executed by a processor. In other embodiments, the functionality may be performed by hardware (e.g., through the use of an application specific integrated circuit (ASIC), a programmable gate array (PGA), a field programmable gate array (FPGA), etc.), or any combination of hardware and software.

Referring to FIG. 3, the method includes, at 200, overlaying a grid of squares onto the arbitrary shape. At 210, the method includes sampling or selecting a number of points on the grid which lie within the interior boundaries of the arbitrary shape. In one embodiment, one point is sampled from each grid square within the interior boundaries of the arbitrary shape. The number of points can be parameterized based on the grid. The method then includes, at 220, creating one or more rectangles beginning at each of the sampled or selected points. For example, the sampled points can be used as the upper-left hand corner for the rectangles that are created. At 230, the method includes gradually stretching or increasing the height and/or width (i.e., the area) of the rectangles until the rectangles touch a position on the boundary of the arbitrary shape, or until the rectangles no longer fall within the arbitrary shape. In one embodiment, the methods described in conjunction with FIGS. 2a-2c can be used at 230. The method then includes, at 240, assigning the largest of the stretched rectangles as the interior bounding box for the arbitrary shape. According to an embodiment, the largest rectangle is the rectangle with the largest area.

In view of the above, embodiments of the invention provide an automated solution that can save developers the time and effort previously required to manually define interior bounding boxes. In addition, certain embodiments have advantages over the use of exterior bounding boxes, because embodiments of the invention are guaranteed to produce a rectangle (as an interior bounding box) whose points are completely inside the shape that requires labeling. As a result, embodiments of the invention guarantee that the label for the shape will be completely within the shape and will not mistakenly overlap onto a neighboring shape.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer program, embodied on a non-transitory computer readable medium, the computer program configured to control a processor to automatically generate a bounding box, the generating comprising:
    sampling a plurality of points that lie within an interior of an arbitrary shape;
    automatically creating a rectangle from each of the points, wherein each of the rectangles lies completely within the interior and each rectangle comprises a pair of height sides and a pair of width sides;
    increasing the height sides and the width sides of the rectangles until each of the rectangles touches at least one side of the arbitrary shape;
    assigning a largest of the increased rectangles as an interior bounding box for the arbitrary shape, wherein the largest of the increased rectangles is the rectangle that has the largest area of the increased rectangles; and
    placing an item within the interior bounding box, wherein the item is contained within the arbitrary shape and the item is at least one of an image or text.

2. The computer program embodied on a non-transitory computer readable medium according to claim 1, wherein each of the plurality of points is a point at a center of a square of a grid that is overlaid on the arbitrary shape.

3. The computer program embodied on a non-transitory computer readable medium according to claim 2, wherein the point at the center of the square is used as an upper-left hand corner for the rectangles.

4. The computer program embodied on a non-transitory computer readable medium according to claim 1, wherein the increasing comprises first increasing the width sides of the rectangle until at least a portion of the left and right height sides of the rectangles touch the arbitrary shape, and then increasing the height sides of the rectangles until at least a portion of the top and bottom width sides of the rectangles touch the arbitrary shape.

5. The computer program embodied on a non-transitory computer readable medium according to claim 1, wherein the increasing comprises first increasing the height sides of the rectangles until at least a portion of the top and bottom width sides of the rectangles touch the arbitrary shape, and then increasing the width sides of the rectangle until at least a portion of the left and right height sides of the rectangles touch the arbitrary shape.

6. The computer program embodied on a non-transitory computer readable medium according to claim 1, wherein the increasing comprises alternately increasing the height sides and width sides of the rectangles until at least a portion of all four sides of the rectangles touch the arbitrary shape.

7. A method for automatically generating a bounding box within an arbitrary shape, the method comprising:
    sampling a plurality of points that lie within interior bounds of an arbitrary shape;
    automatically creating a rectangle from each of the sampled points, wherein each of the rectangles lies completely within the interior and each rectangle comprises a pair of height sides and a pair of width sides;
    stretching the height sides and the width sides of each of the rectangles until they no longer fall within the interior of the arbitrary shape;
    assigning the largest of the stretched rectangles as the interior bounding box, wherein the largest of the stretched rectangles is the rectangle that has the largest area of the stretched rectangles; and
    placing an item within the interior bounding box, wherein the item is contained within the arbitrary shape and the item is at least one of an image or text.

8. The method according to claim 7, wherein each of the plurality of points is a point at a center of a square of a grid that is overlaid on the arbitrary shape.

9. The method according to claim 8, wherein the point at the center of the square is used as an upper-left hand corner for the rectangles.

10. The method according to claim 7, wherein the stretching comprises first increasing the width sides of the rectangle until at least a portion of the left and right height sides of the rectangles touch the arbitrary shape, and then increasing the height sides of the rectangles until at least a portion of the top and bottom width sides of the rectangles touch the arbitrary shape.

11. The method according to claim 7, wherein the stretching comprises first increasing the height sides of the rectangles until at least a portion of the top and bottom width sides of the rectangles touch the arbitrary shape, and then increasing the width sides of the rectangle until at least a portion of the left and right height sides of the rectangles touch the arbitrary shape.

12. The method according to claim 7, wherein the stretching comprises alternately increasing the height sides and width sides of the rectangles until at least a portion of all four sides of the rectangles touch the arbitrary shape.

13. An apparatus for placing an item within an arbitrary shape, the apparatus comprising:
a processor;
a storage device coupled to the processor and storing a bounding box module, the bounding box module, when executed by the processor, causing the processor to implement a sampler, a generator and an assignor;
the sampler configured to sample a plurality of points that lie within an interior of the arbitrary shape;
the generator configured to automatically create a rectangle comprising a pair of height sides and a pair of width sides from each of the points, and to increase the height sides and the width sides of the rectangles until each of the rectangles touches at least one side of the arbitrary shape;
the assignor configured to assign a largest of the increased rectangles as the interior bounding box, wherein the largest of the increased rectangles is the rectangle that has the largest area of the increased rectangles, and place the item within the interior bounding box, wherein the item is contained within the arbitrary shape and the item is at least one of an image or text.

14. The apparatus according to claim 13, wherein each of the plurality of points is a point within the shape at a center of a square of a grid that is overlaid on the shape.

15. The apparatus according to claim 14, wherein the point at the center of the square is used as an upper-left hand corner for the rectangles.

16. The apparatus according to claim 13, wherein the generator is configured to increase the height sides and width sides of the rectangles by first increasing the width sides of the rectangles until at least a portion of the left and right height sides of the rectangles touch the arbitrary shape, and then increasing the height sides of the rectangles until at least a portion of top and bottom width sides of the rectangles touch the arbitrary shape.

17. The apparatus according to claim 13, wherein the generator is configured to increase the height and width sides of the rectangles by first increasing the height sides of the rectangles until at least a portion of the top and bottom width sides of the rectangles touch the arbitrary shape, and then increasing the width sides of the rectangle until at least a portion of left and right height sides of the rectangles touch the arbitrary shape.

18. The apparatus according to claim 13, wherein the generator is configured to increase the height and width sides of the rectangles by alternately increasing the height and width sides of the rectangles until at least a portion of all four sides of the rectangles touch the arbitrary shape.

* * * * *